(12) United States Patent
Schinkowsky

(10) Patent No.: US 9,540,180 B1
(45) Date of Patent: Jan. 10, 2017

(54) COUNTER-WEIGHTED CONVEYOR COVER

(71) Applicant: Formax, Inc., Mokena, IL (US)

(72) Inventor: Kyle Schinkowsky, Genoa City, WI (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 14/815,912

(22) Filed: Jul. 31, 2015

(51) Int. Cl.
*B65G 21/08* (2006.01)
*B65G 33/14* (2006.01)
*B65G 33/24* (2006.01)

(52) U.S. Cl.
CPC ............. *B65G 33/14* (2013.01); *B65G 21/08* (2013.01); *B65G 33/24* (2013.01)

(58) Field of Classification Search
CPC ......... B65G 33/02; B65G 33/08; B65G 33/24; B65G 53/48; B65G 21/08; C10B 7/10; E05C 9/02; E05C 19/10; E05C 19/12; E05C 9/1875; B65D 51/00; Y10T 292/081; Y10T 292/0911; Y10T 292/0937; Y10T 292/0938; Y10T 292/0939; Y10T 292/094
USPC ............................ 198/860.3–860.5, 657–677
See application file for complete search history.

(56) References Cited

U.S. PATENT DOCUMENTS

| 2,656,036 A * | 10/1953 | Whitney | B65G 33/00 174/121 SR |
| 2,760,622 A * | 8/1956 | Magee | A01D 87/02 198/735.5 |
| 2,837,203 A * | 6/1958 | Reeser | B65G 19/28 16/375 |
| 2,896,291 A * | 7/1959 | Gidlow | F16B 5/06 198/860.5 |
| 4,170,293 A * | 10/1979 | Campbell | B65G 21/08 14/70 |
| 4,279,556 A * | 7/1981 | Ronning | B65G 53/48 406/53 |
| 4,540,086 A * | 9/1985 | David | A01D 41/1208 198/536 |
| 4,603,769 A * | 8/1986 | Bach | B65G 69/181 193/12 |
| 4,714,151 A * | 12/1987 | Campbell | B65G 21/08 198/860.1 |
| 5,113,681 A * | 5/1992 | Guesnon | B21D 5/01 72/342.5 |
| 2011/0271607 A1* | 11/2011 | Saura Garcia | B66B 31/00 52/63 |

(Continued)

FOREIGN PATENT DOCUMENTS

FR 2825691 A1 * 12/2002 ............. B62B 11/00

OTHER PUBLICATIONS

International Search Report and Written Opinion for PCT/US16/44502, dated Aug. 25, 2016, 11 pages.

*Primary Examiner* — Mark A Deuble
(74) *Attorney, Agent, or Firm* — Klintworth & Rozenblat IP LLC

(57) ABSTRACT

A conveyor includes a housing, a moveable conveyor member, and a cover. The moveable conveyor member is moveably attached to the housing. The cover is rotate-ably attached to the housing at a pivot point between a closed position covering the moveable conveyor member and an open position uncovering the moveable conveyor member. The cover includes a counter-weight with the counter-weight and a center-of-gravity of the cover located at opposing sides of the pivot point.

27 Claims, 4 Drawing Sheets

(56) References Cited

U.S. PATENT DOCUMENTS

2013/0160801 A1* 6/2013 Vroom ................ A47L 15/0081
134/25.2
2014/0311869 A1* 10/2014 Koenig .................. B65G 33/24
198/658

* cited by examiner

COUNTER-WEIGHTED CONVEYOR COVER

FIELD OF THE DISCLOSURE

This disclosure relates to a counter-weighted cover for a conveyor.

BACKGROUND

Covers are used by some of the current conveyors, such as screw conveyors or other types of conveyors, in order to gain access to the internal components of the conveyor. However, due to the heavy weight of the covers, it is often difficult for users to manually move the covers from their closed to open positions. Moreover, the current conveyors may experience one or more additional issues.

A conveyor cover is needed to reduce one or more issues of one or more of the current conveyors and their methods of use.

SUMMARY

In one embodiment, a screw conveyor is disclosed. The screw conveyor includes a housing, a rotate-able helical screw blade, and a cover. The housing includes a trough. The rotate-able helical screw blade is disposed within the trough. The cover is rotate-ably attached to the housing at a pivot point between a closed position covering the trough and an open position uncovering the trough. The cover includes a counter-weight with the counter-weight and a center-of-gravity of the cover located at opposing sides of the pivot point.

In another embodiment, a conveyor is disclosed. The conveyor includes a housing, a moveable conveyor member, and a cover. The moveable conveyor member is moveably attached to the housing. The cover is rotate-ably attached to the housing at a pivot point between a closed position covering the moveable conveyor member and an open position uncovering the moveable conveyor member. The cover includes a counter-weight with the counter-weight and a center-of-gravity of the cover located at opposing sides of the pivot point.

In yet another embodiment, a method of counter-balancing a cover of a conveyor is disclosed. In one step, a counter-weight is attached to a cover. In another step, the cover is rotate-ably attached to a housing at a pivot point, with the counter-weight and a center-of-gravity of the cover located at opposing sides of the pivot point, so that the cover is rotate-able between a closed position covering a moveable conveyor member attached to the housing and an open position uncovering the moveable conveyor member.

In still another embodiment, a method of moving a cover of a conveyor is disclosed. In one step, a cover, attached to a housing about a pivot point, is rotated between a closed position covering a moveable conveyor member and an open position uncovering the moveable conveyor member with a counter-weight of the cover, attached to the cover at an opposing side of the pivot point as a center-of-gravity of the cover, counter-balancing the center-of-gravity of the cover.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
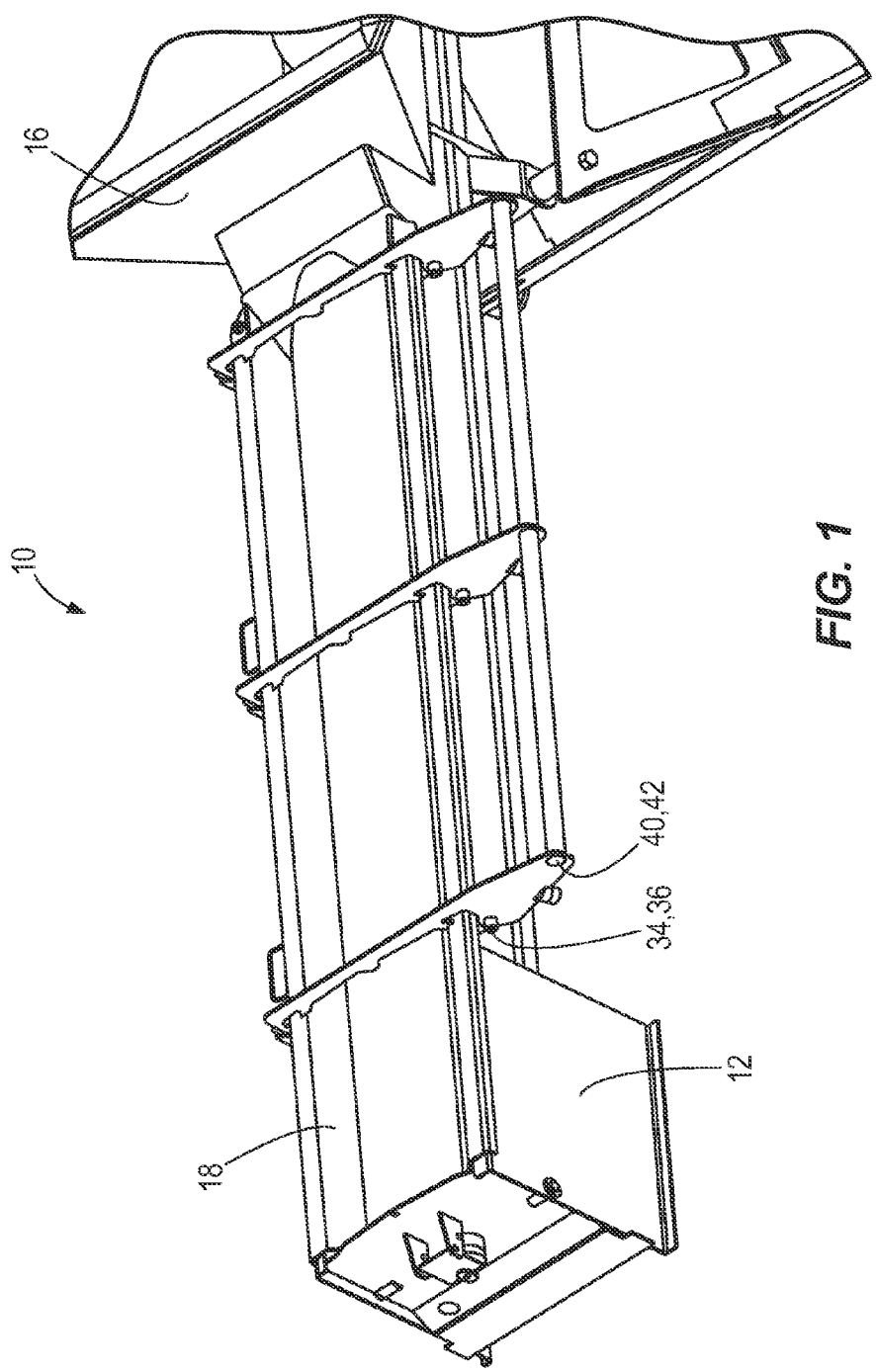
FIG. 1 a perspective view of a conveyor with a cover of the conveyor disposed in a closed position.
Figure 2:
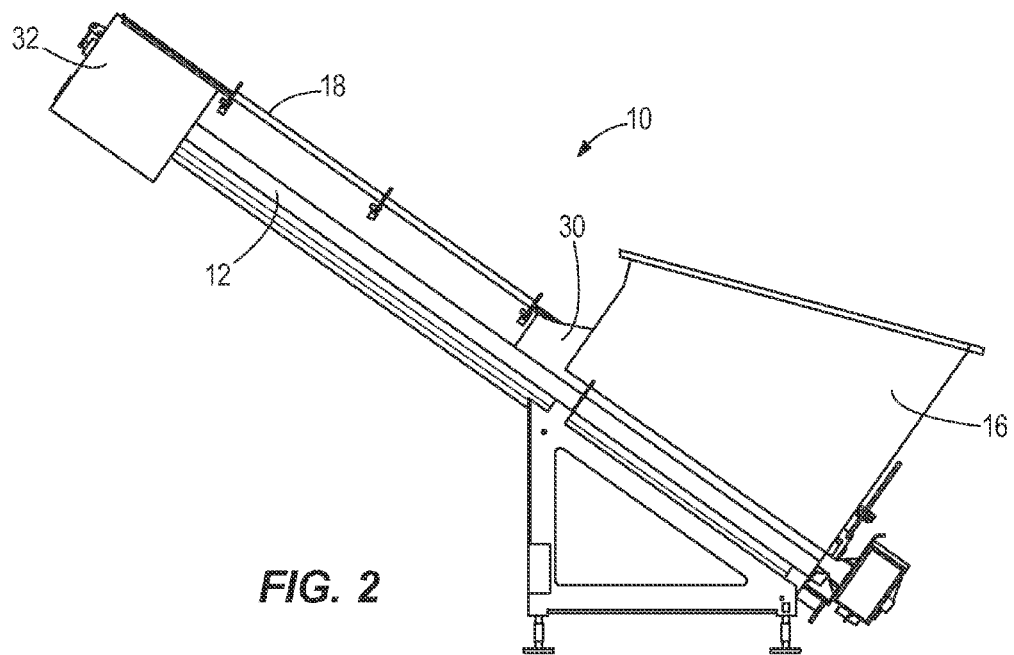
FIG. 2 illustrates a side view of the conveyor of the embodiment of FIG. 1 with the cover of the conveyor disposed in the closed position.
Figure 3:
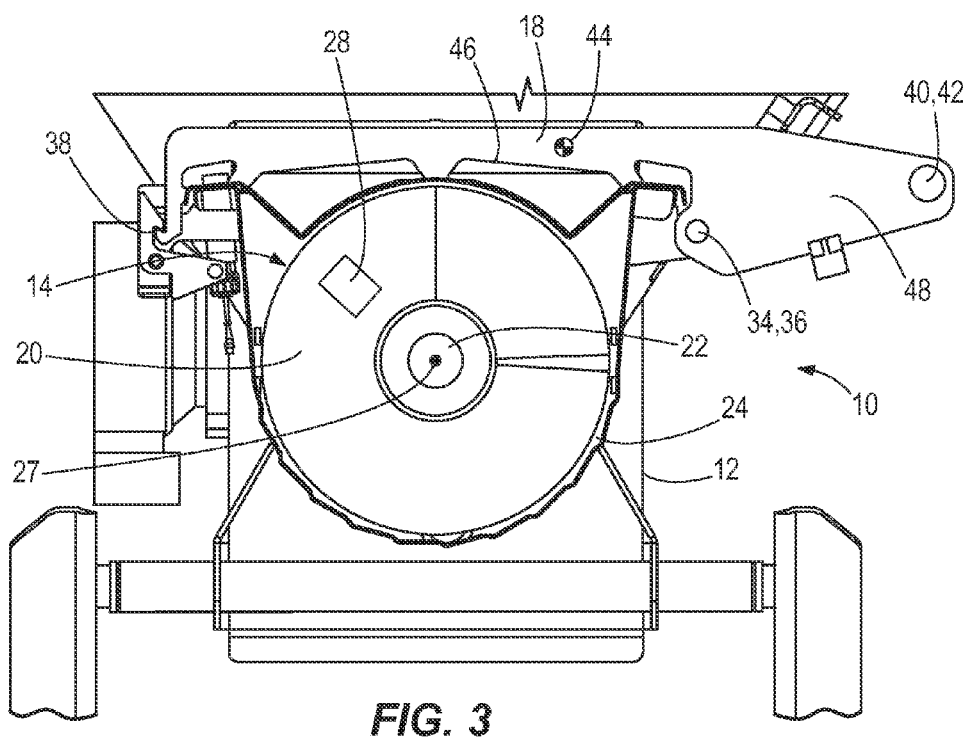
FIG. 3 illustrates an end view of the conveyor of the embodiment of FIG. 1 with the cover of the conveyor disposed in the closed position.
Figure 4:
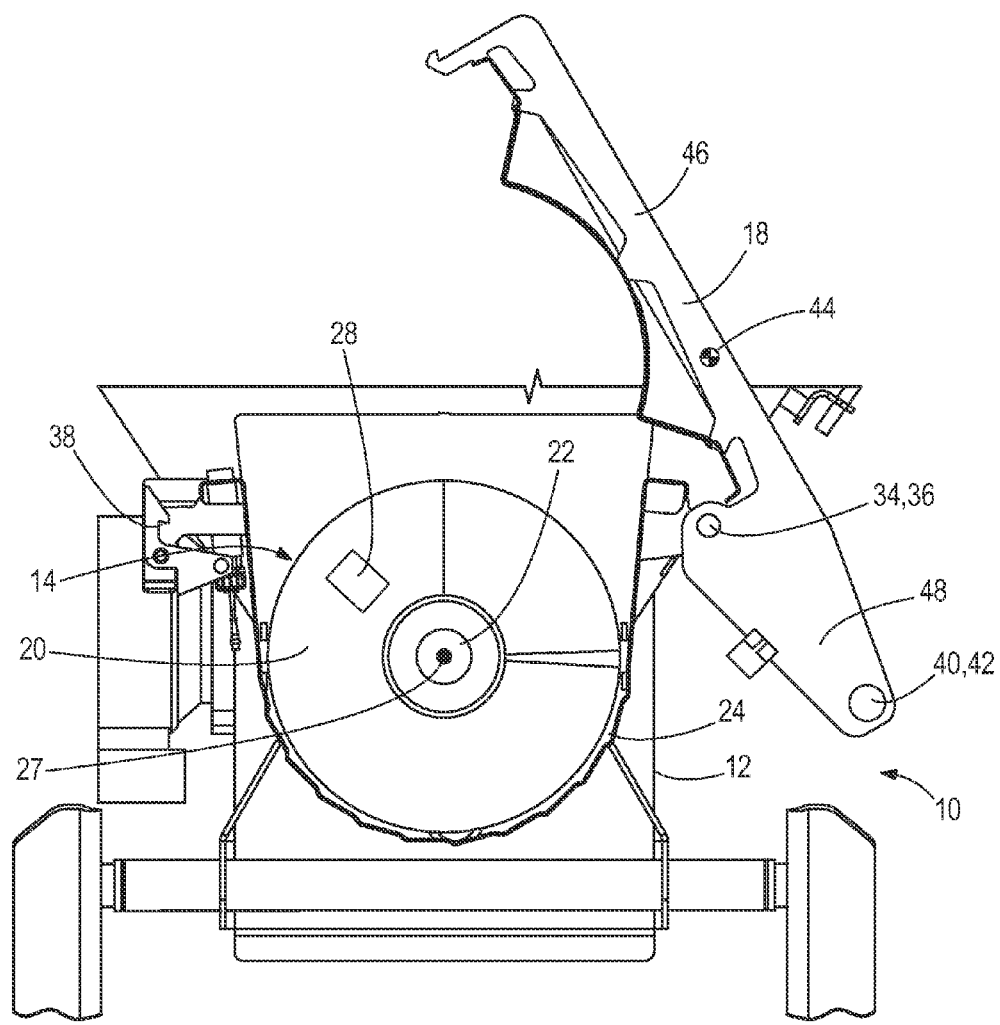
FIG. 4 illustrates the end view of the conveyor of the embodiment of FIG. 1 with the cover of the conveyor disposed in an open position.

FIG. 1 illustrates a perspective view of a conveyor 10 with a cover 18 of the conveyor 10 disposed in a closed position. FIG. 2 illustrates a side view of the conveyor 10 of the embodiment of FIG. 1 with the cover 18 of the conveyor 10 disposed in the closed position. FIG. 3 illustrates an end view of the conveyor 10 of the embodiment of FIG. 1 with the cover 18 of the conveyor 10 disposed in the closed position. FIG. 4 illustrates the end view of the conveyor 10 of the embodiment of FIG. 1 with the cover 18 of the conveyor 10 disposed in an open position.

As illustrated collectively in FIGS. 1-4, the conveyor 10 comprises a housing 12, a moveable conveyor member 14, a motor 16, and a cover 18. The conveyor 10 comprises a screw conveyor with the moveable conveyor member 14 comprising a rotate-able, helical screw blade 20 attached to a shaft 22. In other embodiments, the conveyor 10 and the moveable conveyor member 14 may comprise any type of conveyor and/or moveable conveyor member.

The housing 12 contains a trough 24. The trough 24 is semi-circular. In other embodiments, the shape, size, configuration, and orientation of the housing 12 may vary. The moveable conveyor member 14 is disposed in the trough 24. The motor 16 rotates the shaft 22 around axis 27 thereby rotating the attached helical screw blade 20 around the axis 27 to move product 28, carried by the helical screw blade 20, from an input location 30 at the bottom of the conveyor 10 to an output location 32 at the top of the conveyor 10. The product 28 may comprise any type of product such as a food product or another type of non-food product which needs to be moved from one location to another using the conveyor 10.

As shown in FIGS. 1-3, the cover 18 is moveably attached to the housing 12 between a closed position covering the trough 24 and, as shown in FIG. 4, an open position uncovering the trough 24. The cover 18 is rotate-ably attached to the housing 12 with a hinge 34 at a pivot point 36 rotate-ably attaching the cover 18 to the housing 12 so that the cover 18 is moveable between the closed position of FIGS. 1-3 covering the trough 24 and the open position of FIG. 4 uncovering the trough 24. When the cover 18 is disposed in the open position of FIG. 4 uncovering the trough 24, the moveable conveyor member 14 disposed within the trough 24 is uncovered allowing for a user to gain access to the moveable conveyor member 14 for maintenance. A latch 38 is configured to lock the cover 18 to the housing 12 and to unlock the cover 18 from the housing 12 when the cover 18 is disposed in the closed position of FIGS. 1-3 covering the trough 24.

The cover 18 comprises a counter-weight 40 attached to and within an opening 42 of the cover 18. The counter-weight 40 may be press-fit or adhered within the opening 42 of the cover 18. In other embodiments, the counter-weight may be attached within the opening of the cover using varying attachment mechanisms such as fasteners or other types of attachment mechanisms. In still other embodiments, the counter-weight 40 may be attached to any portion of the cover 18. In one embodiment, the cover 18 and the counter-weight 40 are both made of the same material, such as stainless steel or another type of material, with the cover 18 being much thinner than the counter-weight 40. In another embodiment, the cover 18 is made of a first material and the counter-weight 40 is made of a second material with the second material being different than the first material and having a higher volumetric mass density (mass per unit volume) than the first material of the cover 18. In other embodiments, the cover 18 and the counter-weight 40 may vary in shape, dimensions, orientation, configuration, or material. The counter-weight 40 of the cover 18 and the center-of-gravity 44 of the cover 18 are located at opposing sides 46 and 48 of the pivot point 36 rotate-ably attaching the cover 18 to the housing 12.

The counter-weight 40 counter-balances the center-of-gravity 44 of the cover 18. The presence of the counter-weight 40 moves the center-of-gravity 44 of the cover 18 closer to the pivot point 36 than where the center-of-gravity 44 of the cover 18 would have been if the cover 18 did not include the counter-weight 40. The counter-weight 40 allows a user to move the cover 18 from the closed position of FIGS. 1-3 to the open position of FIG. 4 with a range of 1 percent to 99 percent less force than the user would have needed to move the cover from the closed position to the open position if the cover 18 did not comprise the counter-weight 40. Preferably, the counter-weight 40 allows a user to move the cover 18 from the closed position of FIGS. 1-3 to the open position of FIG. 4 with at least 25 percent less force than the user would have needed to move the cover from the closed position to the open position if the cover 18 did not comprise the counter-weight 40. In other embodiments, the counter-weight 40 may vary in type, size, attachment, configuration, orientation, location, or function and may allow for the cover 18 to move from the closed position of FIGS. 1-3 to the open position of FIG. 4 with varying amounts of force. In still other embodiments, the conveyor 10, housing 12, moveable conveyor member 14, motor 16, and cover 18 may vary in type, shape, configuration, orientation, configuration, or function.

Figure 5:
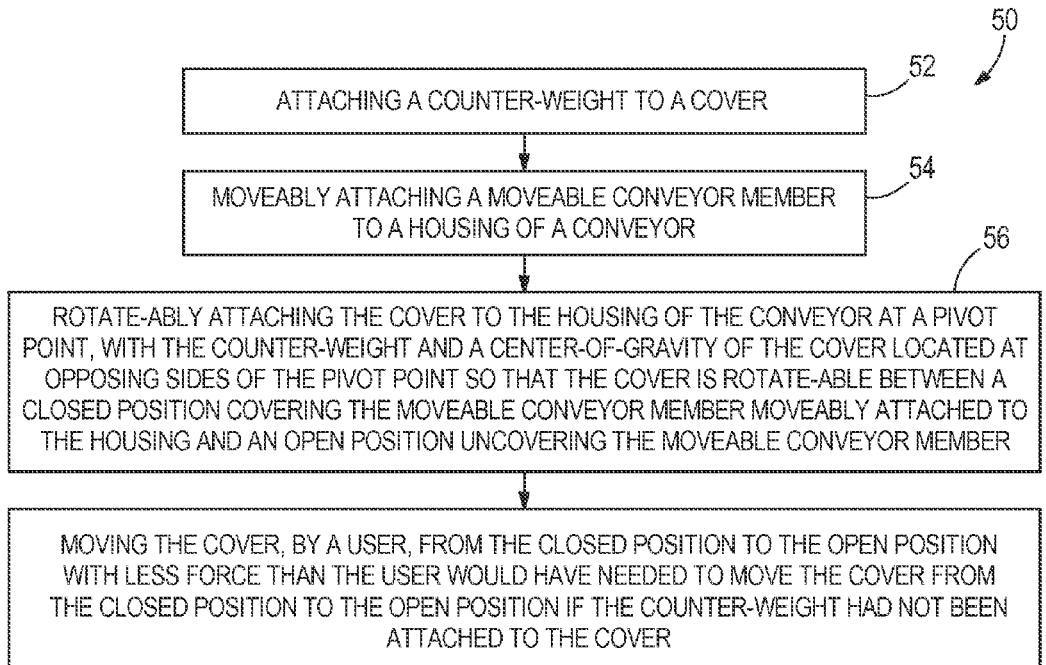
FIG. 5 illustrates a flowchart of one embodiment of a method of counter-balancing a cover of a conveyor.

FIG. 5 illustrates a flowchart of one embodiment of a method 50 of counter-balancing a cover of a conveyor. The method 50 may utilize any conveyors of the instant disclosure. In other embodiments, the method 50 may utilize varying conveyors. In step 52, a counter-weight is attached to a cover. In one embodiment, the cover and the counter-weight may be made of the same material but may comprise varying thicknesses. In another embodiment, the cover may comprise a first material and the counter-weight may comprise a second material which is different than the first material having a higher volumetric mass density (mass per unit volume) than the first material of the cover. In one embodiment, the counter-weight may be disposed in an opening of the cover.

In step 54, a moveable conveyor member is moveably attached to a housing of a conveyor. In one embodiment, step 54 comprises disposing a rotate-able helical screw blade within a trough of the housing of the conveyor. In other embodiments, the moveable conveyor member may vary.

In step 56, the cover is rotate-ably attached to the housing of the conveyor at a pivot point, with the counter-weight and a center-of-gravity of the cover located at opposing sides of the pivot point so that the cover is rotate-able between a closed position covering the moveable conveyor member moveably attached to the housing and an open position uncovering the moveable conveyor member. In one embodiment, step 56 further comprises the presence of the counter-weight moving the center-of-gravity of the cover closer to the pivot point than where the center-of-gravity would have been without the presence of the counter-weight. In one embodiment, step 56 further comprises the counter-weight counter-balancing the center-of-gravity of the cover. In one embodiment, step 56 further comprises disposing a hinge at the pivot point with the hinge attaching the cover to the housing.

In step 58, a user moves the cover from the closed position to the open position with a range of 1 percent to 99 percent less force than the user would have needed to move the cover from the closed position to the open position if the counter-weight had not been attached to the cover. Preferably, the amount of force required to move the cover from the closed position to the open position is at least 25 percent less force than would have been needed if the counter-weight had not been attached to the cover. In still other embodiments, this percentage of reduced force necessary to move the cover from the closed position to the open position may vary.

In other embodiments, one or more steps of the method 50 may be varied in substance or order, one or more steps of the method 50 may not be followed, or one or more additional steps may be added to the method 50. In still other embodiments, the method 50 may vary further.

Figure 6:
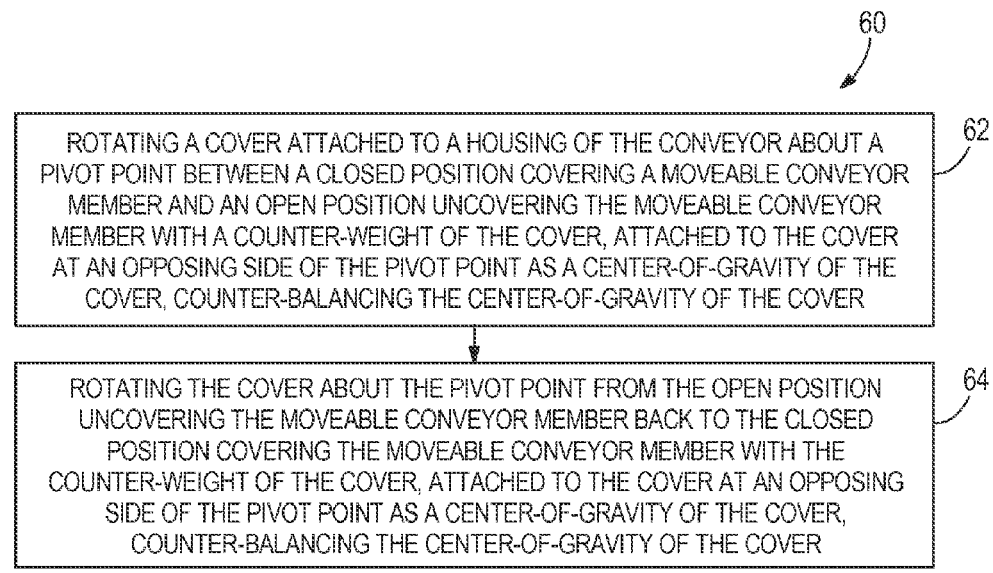
FIG. 6 illustrates a flowchart of one embodiment of a method of moving a cover of a conveyor.

FIG. 6 illustrates a flowchart of one embodiment of a method 60 of moving a cover of a conveyor. The method 60 may utilize any conveyors of the instant disclosure. In other embodiments, the method 60 may utilize varying conveyors. In step 62, a cover, attached to a housing of the conveyor about a pivot point, is rotated between a closed position covering a moveable conveyor member and an open position uncovering the moveable conveyor member with a counter-weight of the cover, attached to the cover at an opposing side of the pivot point as a center-of-gravity of the cover, counter-balancing the center-of-gravity of the cover. In step 64, the cover is rotated about the pivot point from the open position uncovering the moveable conveyor member back to the closed position covering the moveable conveyor member with the counter-weight of the cover, attached to the cover at an opposing side of the pivot point as a center-of-gravity of the cover, counter-balancing the center-of-gravity of the cover.

In one embodiment, the conveyor may comprise a screw conveyor and the moveable conveyor member may comprise a rotate-able helical screw blade disposed within a trough of the housing of the conveyor. In another embodiment, the conveyor and the moveable conveyor member may vary. In one embodiment, the cover may comprise a first material and the counter-weight may comprise a second material which is different than the first material. The second material of the counter-weight may have a higher volumetric mass density (mass per unit volume) than the first material of the cover. In another embodiment, the first and the second materials may vary. In one embodiment, the counter-weight may be disposed in an opening of the cover. In another embodiment, the counter-weight may be attached to any portion of the cover.

In one embodiment, the presence of the counter-weight may move the center-of-gravity of the cover closer to the pivot point than where the center-of-gravity of the cover would have been without the presence of the counter-weight. In another embodiment, the location of the center-of-gravity of the cover relative to the pivot point may vary. In one embodiment, the rotating the cover may be done using a hinge disposed at the pivot point. In another embodiment, the rotating the cover may be done using varying rotation mechanisms. In one embodiment, the rotating the cover may comprise a user rotating the cover from the closed position to the open position with a range of 1 percent to 99 percent less force than the user would have needed to move the cover from the closed position to the open position if the counter-weight had not been attached to the cover. In another embodiment, the amount of force reduction needed to move the cover from the closed position to the open position may vary.

In other embodiments, one or more steps of the method 60 may be varied in substance or order, one or more steps of the method 60 may not be followed, or one or more additional steps may be added to the method 60. In still other embodiments, the method 60 may vary further.

One or more embodiments of the disclosure, utilizing a counter-weighted conveyor cover, may reduce the force needed by a user to move the conveyor cover from a closed position to an open position in order to gain access to a moveable conveyor member disposed in the conveyor. Moreover, one or more embodiments of the disclosure may reduce or eliminate one or more additional issues of one or more of the current conveyors.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A screw conveyor comprising:
   a housing comprising a trough;
   a rotate-able helical screw blade disposed within the trough; and
   a cover rotate-ably attached to the housing at a pivot point, the cover rotate-able between a closed position covering the trough and an open position uncovering the trough;
   wherein the cover comprises an opening containing a counter-weight, the counter-weight and a center-of-gravity of the cover located at opposing sides of the pivot point.

2. The screw conveyor of claim 1 wherein the cover is made of a first material and the counter-weight is made of a second material.

3. The screw conveyor of claim 2 wherein the second material has a higher volumetric mass density (mass per unit volume) than the first material.

4. The screw conveyor of claim 1 wherein the counter-weight counter-balances the center-of-gravity of the cover.

5. The screw conveyor of claim 1 further comprising a hinge disposed at the pivot point, the hinge attaching the cover to the housing.

6. The screw conveyor of claim 1 wherein the counter-weight allows a user to move the cover from the closed position to the open position with less force than the user would have needed to move the cover from the closed position to the open position if the cover did not comprise the counter-weight.

7. A conveyor comprising:
   a housing;
   a moveable conveyor member moveably attached to the housing; and
   a cover rotate-ably attached to the housing at a pivot point, the cover rotate-able between a closed position covering the moveable conveyor member and an open position uncovering the moveable conveyor member;
   wherein the cover comprises an opening containing a counter-weight, the counter-weight and a center-of-gravity of the cover located at opposing sides of the pivot point.

8. The conveyor of claim 7 wherein the cover is made of a first material and the counter-weight is made of a second material.

9. The conveyor of claim 8 wherein the second material has a higher volumetric mass density (mass per unit volume) than the first material.

10. The conveyor of claim 7 wherein the counter-weight counter-balances the center-of-gravity of the cover.

11. The conveyor of claim 7 further comprising a hinge disposed at the pivot point, the hinge attaching the cover to the housing.

12. The conveyor of claim 7 wherein the counter-weight allows a user to move the cover from the closed position to the open position with less force than the user would have needed to move the cover from the closed position to the open position if the cover did not comprise the counter-weight.

13. A method of counter-balancing a cover of a conveyor comprising:
   disposing a counter-weight in an opening of a cover; and
   rotate-ably attaching the cover to a housing at a pivot point, with the counter-weight and a center-of-gravity of the cover located at opposing sides of the pivot point, so that the cover is rotate-able between a closed position covering a moveable conveyor member attached to the housing and an open position uncovering the moveable conveyor member.

14. The method of claim 13 further comprising the presence of the counter-weight moving the center-of-gravity of the cover closer to the pivot point than where the center-of-gravity of the cover would have been without the presence of the counter-weight.

15. The method of claim 13 further comprising disposing the moveable conveyor member, comprising a rotate-able helical screw blade, within a trough of the housing.

16. The method of claim 13 further comprising the cover comprising a first material and the counter-weight comprising a second material.

17. The method of claim 16 further comprising the second material having a higher volumetric mass density (mass per unit volume) than the first material.

18. The method of claim 13 further comprising the counter-weight counter-balancing the center-of-gravity of the cover.

19. The method of claim 13 further comprising disposing a hinge at the pivot point with the hinge attaching the cover to the housing.

20. The method of claim 13 further comprising a user moving the cover from the closed position to the open position with less force than the user would have needed to move the cover from the closed position to the open position if the counter-weight had not been attached to the cover.

21. A method of moving a cover of a conveyor comprising:
rotating a cover, attached to a housing about a pivot point, between a closed position covering a moveable conveyor member and an open position uncovering the moveable conveyor member with a counter-weight, disposed within an opening of the cover at an opposing side of the pivot point as a center-of-gravity of the cover, counter-balancing the center-of-gravity of the cover.

22. The method of claim 21 further comprising the presence of the counter-weight moving the center-of-gravity of the cover closer to the pivot point than where the center-of-gravity of the cover would have been without the presence of the counter-weight.

23. The method of claim 21 wherein the moveable conveyor member comprises a rotate-able helical screw blade disposed within a trough of the housing.

24. The method of claim 21 wherein the cover comprises a first material and the counter-weight comprises a second material.

25. The method of claim 24 wherein the second material has a higher volumetric mass density (mass per unit volume) than the first material.

26. The method of claim 21 wherein the rotating the cover comprises rotating the cover relative to the housing using a hinge disposed at the pivot point.

27. The method of claim 21 wherein the rotating the cover comprises a user rotating the cover from the closed position to the open position with less force than the user would have needed to move the cover from the closed position to the open position if the counter-weight had not been attached to the cover.

* * * * *